(12) United States Patent
LoRe et al.

(10) Patent No.: US 6,183,088 B1
(45) Date of Patent: Feb. 6, 2001

(54) THREE-DIMENSIONAL DISPLAY SYSTEM

(75) Inventors: Andrew G. LoRe, West Orange, NJ (US); Gregg E. Favalora, Cambridge, MA (US); Michael G. Giovinco, White Plains, NY (US)

(73) Assignee: Actuality Systems, Inc., Reading, MA (US)

( * ) Notice: Under 35 U.S.C. 154(b), the term of this patent shall be extended for 0 days.

(21) Appl. No.: 09/318,086

(22) Filed: May 25, 1999

Related U.S. Application Data

(60) Provisional application No. 60/086,911, filed on May 27, 1998.

(51) Int. Cl.$^7$ ................................................ B05D 21/28
(52) U.S. Cl. ............................ 353/7; 359/477; 359/478; 353/10
(58) Field of Search ........................ 353/7, 8, 10, 79; 359/446, 458, 443, 478, 479, 477

(56) References Cited

U.S. PATENT DOCUMENTS

| | | | |
|---|---|---|---|
| 4,160,973 | 7/1979 | Berlin, Jr. ........................... | 340/718 |
| 4,319,805 * | 3/1982 | Nicolas ............................... | 353/79 |
| 4,943,851 * | 7/1990 | Lang et al. . | |
| 4,983,031 * | 1/1991 | Solomon ............................. | 353/10 |
| 5,042,909 | 8/1991 | Garcia, Jr. et al. ................. | 359/478 |
| 5,082,350 | 1/1992 | Garcia et al. ...................... | 359/478 |
| 5,148,310 | 9/1992 | Batchko ............................. | 359/479 |
| 5,537,251 * | 7/1996 | Shimada ............................. | 359/462 |
| 5,678,910 * | 10/1997 | Martin ................................ | 353/7 |
| 5,754,147 | 5/1998 | Tsao et al. ......................... | 345/6 |
| 5,954,414 * | 9/1999 | Tsao .................................. | 353/7 |
| 6,072,545 * | 6/2000 | Gribschaw et al. .............. | 348/756 |

* cited by examiner

Primary Examiner—William Dowling
(74) Attorney, Agent, or Firm—Fish & Richardson P.C.

(57) ABSTRACT

A three-dimensional display system is disclosed which includes a display target that receives a projected image and that rotates about an axis to form a three-dimensional image from the projected image. The display target has front and back surfaces that meet at locations relative to the axis to form tapered edges. Scanning optics directs light to the display target to form the projected image. A controller controls operation of the display target and the scanning optics.

28 Claims, 10 Drawing Sheets

THREE-DIMENSIONAL DISPLAY SYSTEM

CROSS REFERENCE TO RELATED APPLICATIONS

The subject application claims priority from U.S. Provisional Application No. 60/086,911, filed May 27, 1998 and entitled "Improved Screen Geometries For Multiplanar Volumetric Displays".

BACKGROUND OF THE INVENTION

The invention relates generally to display screens for three-dimensional display systems, and to display systems which employ such display screens.

Multiplanar three-dimensional (hereinafter "3-D") displays produce 3-D imagery by illuminating a target surface undergoing periodic motion. FIG. 1 shows an example of such a target. In operation, display target 1 rotates (or "sweeps") about axis 2 through a 3-D display volume 4. One or more light sources (not shown) are used to project one-dimensional (hereinafter "1-D") or two-dimensional (hereinafter "2-D") images onto surfaces 5 and 6 of display target 1 as it rotates. These images, coupled with the persistence of human vision, cause a volume-filling (or "volumetric") 3-D image 7 to be perceived by a viewer as display target 1 rotates.

Conventional multiplanar 3-D displays produce "edge-on" dark regions wherever sections of the display target are coplanar with a viewer's line of sight. FIG. 2, which is a top view of display target 1, illustrates this phenomenon. As shown, a viewer at location 9 will perceive a dark region in a resulting 3-D image due to insufficient light emanating from the screen in the viewer's line of sight 8.

SUMMARY OF THE INVENTION

One aspect of the invention alters the geometry of a 3-D display target so as to reduce the amount of edge-on darkness perceived by a viewer. To this end, the display target of the present invention includes tapered edges, as opposed to conventional flat edges. For example, the display target may have a "diamond-shaped" cross-section or, more generally, any type of cross-section having tapered edges. By including tapered edges on the display target, it is possible to reduce the amount of the display target's edge that is in a viewer's line of sight, and thereby reduce the amount of edge-on dark regions in a resulting 3-D image.

Another way to reduce edge-on darkness is to make the display target "ultra-thin", e.g., on the order of one millimeter (1 mm) or less. Use of an ultra-thin display target also reduces the amount of display target edge that is in a viewer's line of sight, and thus also reduces edge-on dark regions in resulting 3-D images. To reduce edge-on darkness even further, tapered edges may be included on an ultra-thin display target.

Heretofore, the use of an ultra-thin display target such as that described above was impractical due to its inherent instability at the frequencies of rotation required for 3-D imaging. In accordance with another aspect of the invention, the ultra-thin display target is embedded inside a translucent host which provides the display target with the stability necessary for 3-D imaging. In this regard, to enhance stability and reduce the deleterious effects of air resistance and imbalance on a resulting image any display target described herein may be embedded in such a translucent host.

In general, in one aspect the invention features a display target which receives a projected image (e.g., 1-D and/or 2-D images) and which rotates about an axis to form a 3-D image from the projected image. The display target includes front and back surfaces that meet at locations relative to the axis to form tapered edges.

In preferred embodiments, the display target includes one or more of the following features/functions: The front and back surfaces meet at distances from the axis to form tapered side edges of the display target. The front and back surfaces meet along the axis to form tapered top and bottom edges of the display target. A thickness of the display target at each tapered edge is less than a thickness of the display target between opposing tapered edges, with thickness being defined by a distance between the front and back surfaces. A cross-sectional area of the display target taken parallel to the axis is substantially diamond-shaped or substantially convex or concave in shape. A cross-sectional area of the display target taken perpendicular to the axis is substantially diamond-shaped or substantially convex or concave in shape. The front and back surfaces are substantially rectangular or helical. The display target is comprised of a molded plexiglass screen and/or is embedded in a translucent host.

In general, in another aspect the invention features a display apparatus for use in a 3-D display system. The display apparatus includes a translucent host and a display target embedded inside the translucent host. The display target receives a projected image and rotates while inside the translucent host to form a 3-D image from the projected image. At least a portion of the display target has a thickness on the order of one millimeter (1 mm) or less.

In preferred embodiments, the display apparatus includes one or more of the following features/functions: The translucent host is a translucent cylinder, and the display target is embedded in the translucent cylinder. The display target is substantially rectangular or helical. The display target rotates about an axis to form the 3-D image, and includes front and back surfaces that meet at locations relative to the axis to form tapered edges. A cross-sectional area of the display target taken either parallel to, or perpendicular to, the axis is substantially diamond-shaped or substantially convex or concave in shape. The display target is a layer of paint or any other type of reflective/diffusive substance embedded inside the translucent host.

In general, in still another aspect the invention features a 3-D display system that includes a display target which receives a projected image and which rotates about an axis to form a 3-D image from the projected image. The display target has front and back surfaces that meet at locations relative to the axis to form tapered edges. Scanning optics directs light to the display target to form the projected image. A controller controls operation of the display target and the scanning optics.

In general, in still another aspect the invention features a 3-D display system that includes a translucent host and a display target embedded in the translucent host. The display target receives a projected image and rotates about an axis to form a 3-D image from the projected image. At least a portion of the display target has a thickness on the order of one millimeter (1 mm) or less. Scanning optics directs light to the display target to form the projected image. A controller controls operation of the display target and the scanning optics.

Advantages of the invention in addition to those set forth above will become apparent in view of the following description, including the figures, and the claims.

DESCRIPTION OF THE PREFERRED EMBODIMENTS

Figure 3:
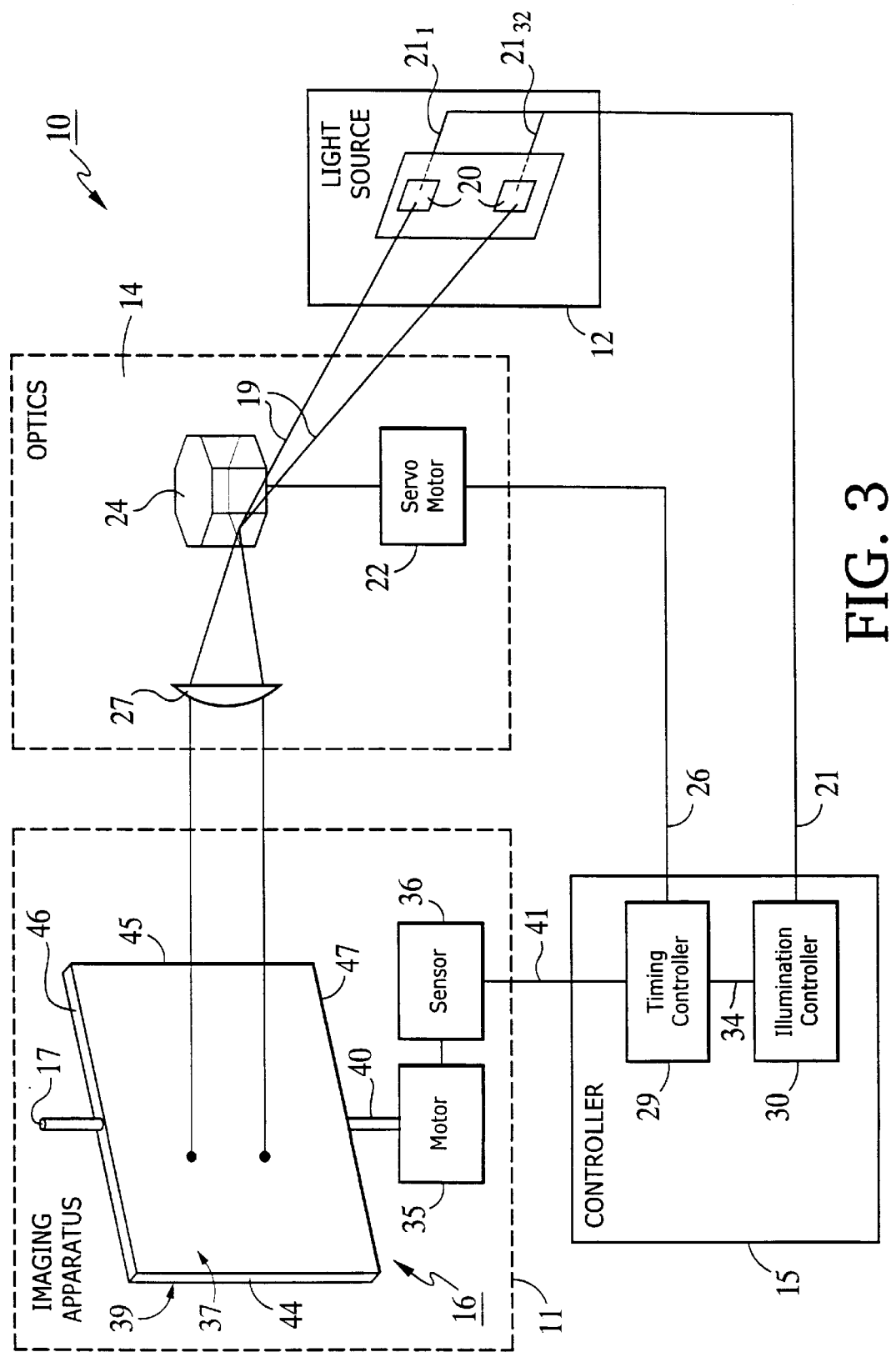
FIG. 3 shows a 3-D display system in which the present invention may be implemented.

FIG. 3 shows an embodiment of a 3-D display system 10 in which the invention may be implemented. As shown in FIG. 3, display system 10 is comprised of four basic components: display apparatus 11, light source 12, scanning optics 14, and controller 15. Briefly, display apparatus 11 includes a display target 16 which rotates about axis 17. Light source 12 outputs light beams 19, which are directed by scanning optics 14 to project 1-D and/or 2-D images onto display target 16. Controller 15 synchronizes operation of light source 12, display apparatus 11, and scanning optics 14 so that volumetric 3-D images are generated from the projected 1-D/2-D images as display target 16 rotates.

In more detail, light source 12 includes an array of N (N≧1) individually controllable (i.e., addressable) light sources 20. In one embodiment, light source 12 comprises thirty two individually addressable laser diodes arranged in a fixed linear array. When driven, these diodes produce coplanar fixed source beams 19 of light that are directed toward scanning optics 14, which then directs these light beams to the display target of display apparatus 11. An illumination control signal 21 drives the diodes, and includes individual binary gating signals $21_1$–$21_{32}$ that control when each of the laser diodes is driven.

Scanning optics 14 includes one or more rotating mirrors, which are driven by a servo-controlled motor 22, and which are used to direct light beams 19 onto display target 16 to form images. In the embodiment shown in FIG. 3, an octagonal mirror 24 is used; however, other mirror configurations may be used as well. When the source beams 19 reflect off a single facet of mirror 24, reflected beams scan through the display volume of the display target. The mirror therefore rotates much more rapidly than the display target so that many scans are executed during each revolution of the display target. The rate of rotation of mirror 24 is determined by a scanning control signal 26 generated by controller 15. This signal drives the controller of servo-controlled motor 22.

In the embodiment depicted in FIG. 3, scanning optics 14 also includes lens 27 to direct the light beams toward the display target. The lens is positioned approximately one focal length from the point of reflection of the light beams on the surface of mirror 24. It is used to focus the light beams reflected off of mirror 24 onto display target 16 to form the 1-D and/or 2-D images.

Controller 15 synchronizes the rotation of display target 16 and mirror 24 and drives light sources 12 accordingly. To this end, controller 16 includes timing controller 29 and illumination controller 30. Timing controller 29 uses a timing signal 41 (described below) from display apparatus 11 to produce scanning control signal 26 and an illumination timing signal 34. Scanning control signal 26 controls servo motor 22. Illumination controller 30 uses illumination timing signal 34 to generate illumination control signal 21 which, in turn, is used to gate the illumination of diode light sources 12. Detailed implementations of timing controller 29 and illumination controller 30 can be found in allowed U.S. Pat. Application No. 08/819,119, filed Mar. 17, 1997 and entitled "Multiplanar Autostereoscopic Imaging System", the contents of which are incorporated herein by reference.

Display apparatus 11 includes a rotating display target 16 which is driven by a motor 35, and an optical sensor 36 which detects each full revolution of the display target. In one embodiment, display target 16 is a molded plexiglass or acrylic screen having front and back surfaces 37 and 39, respectively. These surfaces are coated with a thin layer of vellum having diffusive/reflective surfaces onto which images are formed. The size of display target 16 depends upon the system geometry.

Motor 35 has a rotating shaft 40 that is attached to roughly the midpoint of display target 16. On each full revolution of the motor, optical sensor 32 produces a pulse on a master timing signal 41. This timing signal is used by controller 15, as described above, to derive all other timing signals in the system.

Figure 1:
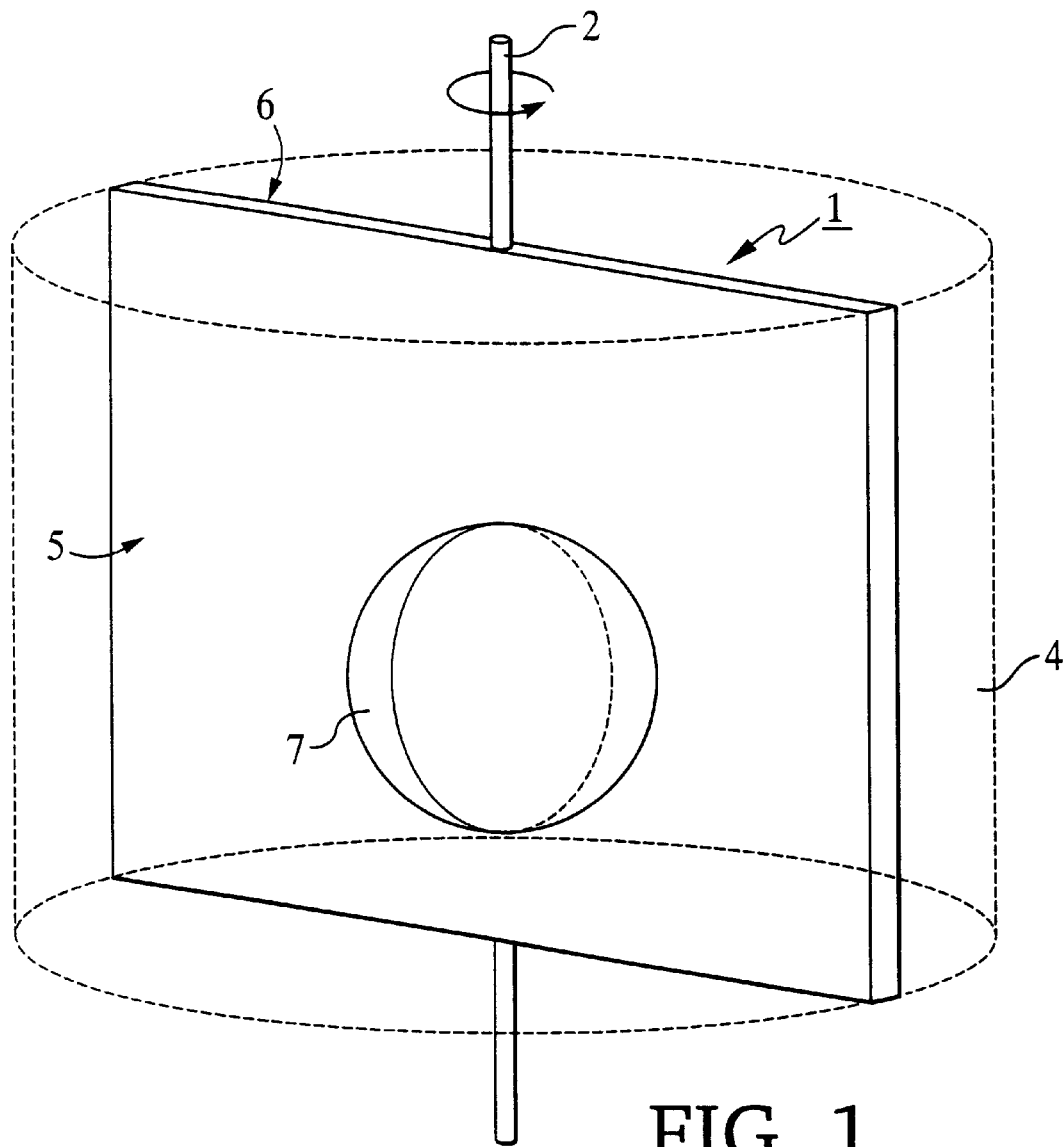
FIG. 1 shows a display target sweeping through a 3-D volume to create a 3-D image.

Like that shown in FIG. 1, display target 16 sweeps out a cylindrical projection volume as it rotates, a subspace of which may be occupied by a 3-D image. Display target 16 is illuminated on either its front or back surface, depending on the point in the rotation. That is, display target 16 includes a single projection surface, which corresponds to a single surface being illuminated at a particular point in the rotation.

Display target Having Tapered Edges

As shown in FIG. 3, display target 16 includes side edges 44 and 45, top edge 46 and bottom edge 47. In some embodiments, the front and back faces of display target 16 meet to form tapered side edges and/or tapered top and bottom edges. What is meant by "tapered" in this context is that the thickness of the display target (i.e., the distance between its front and back surfaces) decreases towards the edges relative to a fixed point, such as the axis of rotation.

Figure 4:
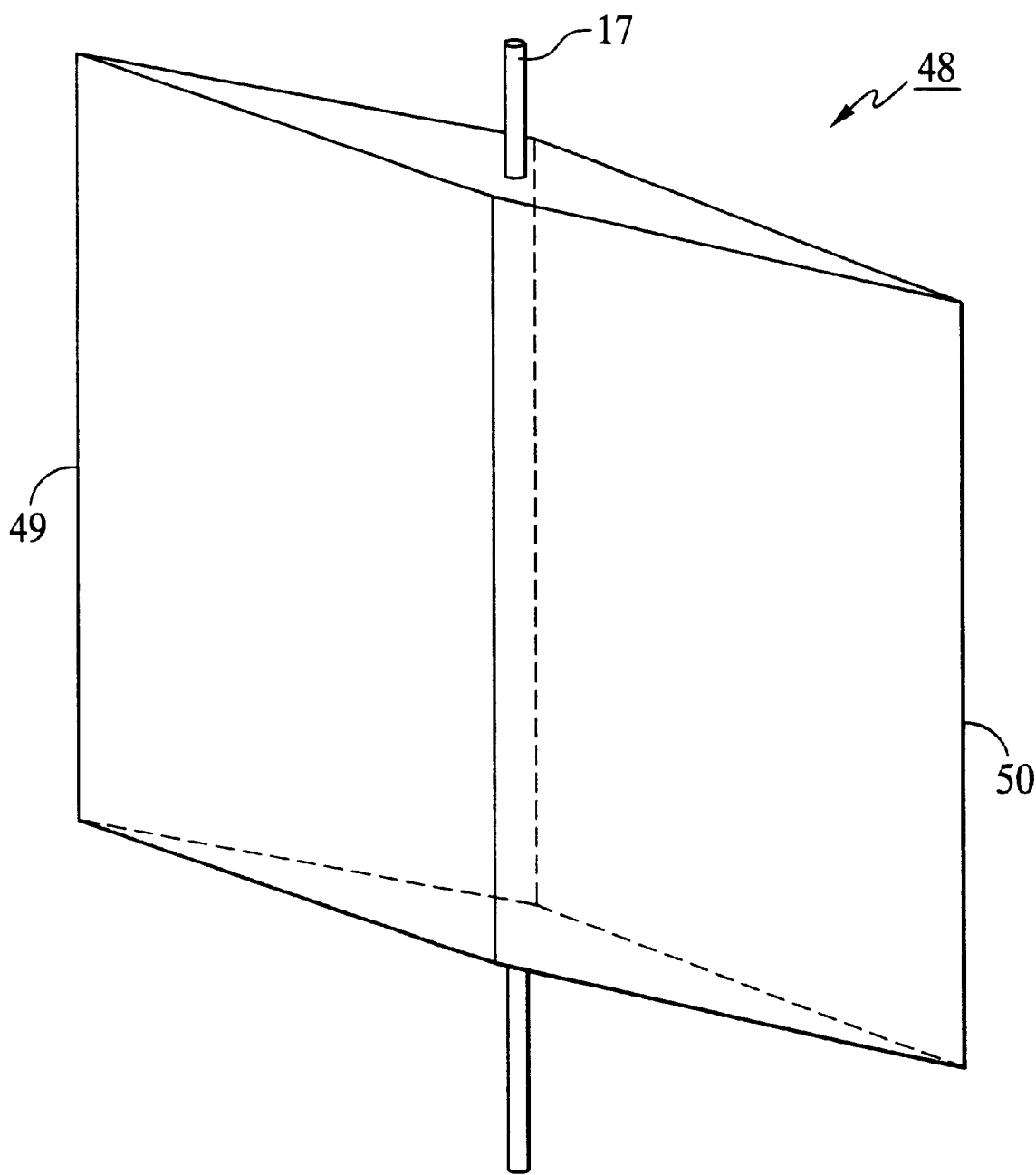
FIG. 4 shows a display target having tapered side edges, but not tapered top and bottom edges.
Figure 5:
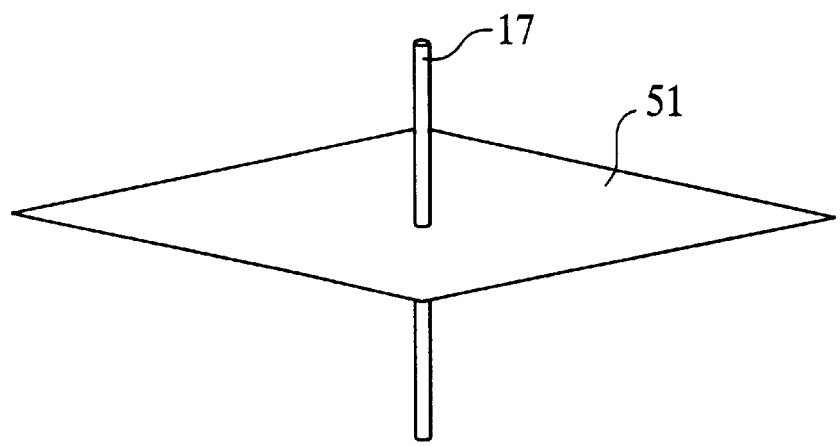
FIG. 5 shows a cross-section of the display target of FIG. 4 taken roughly perpendicular to its axis of rotation.
Figure 15:
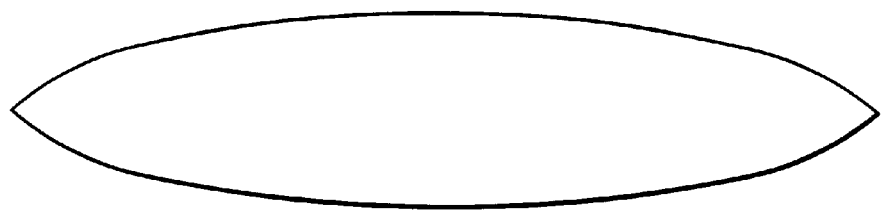
FIG. 15 shows a cross-section of a convex display target with tapered edges.
Figure 16:
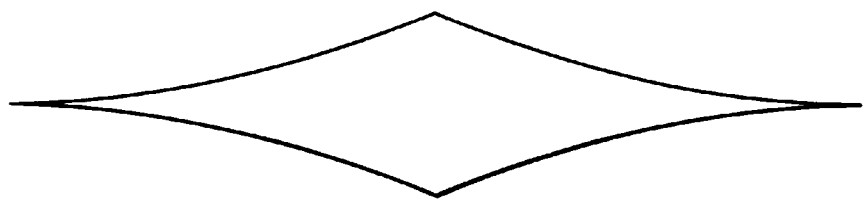
FIG. 16 shows a cross-section of a concave display target with tapered edges.

FIG. 4 shows a perspective view of a rectangular display target 48 having tapered side edges 49 and 50. In this example, tapered side edges 49 and 50 are roughly equidistant from axis of rotation 17, and a cross-section of display target 48 taken roughly perpendicular to axis 17 is substantially diamond in shape. This cross-section 51 is depicted in FIG. 5. It is noted, however, that the invention is not limited to a display target having a diamond shaped cross-section. Rather, a display target having any generally convex cross-section with tapered edges (see FIG. 15) or any generally concave cross-section with tapered edges (see FIG. 16) may be used.

Figure 6:
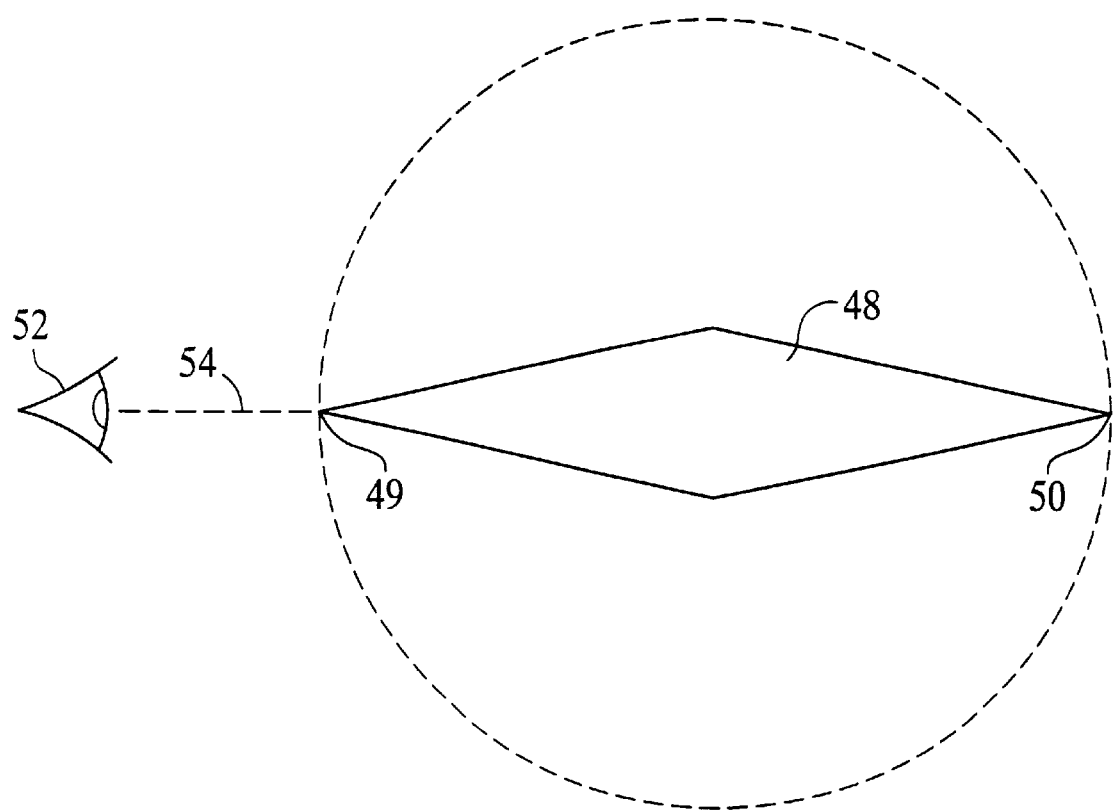
FIG. 6 illustrates how the display target of FIG. 4 reduces edge-on darkness.

Tapered edges such as those shown in FIG. 4 reduce the amount of "edge" in a viewer's line of sight, and thereby reduce the amount of edge-on darkness present in a resulting 3-D image. In this regard, FIG. 6 shows a top view of a person viewing display target 48. As shown in the figure, the portion of display target 48 that may be coplanar with the person's line of sight 54 is substantially reduced due to the tapering of side edges 49 and 50. As a result, the amount of edge-on darkness experienced by the person is decreased.

Figure 7:
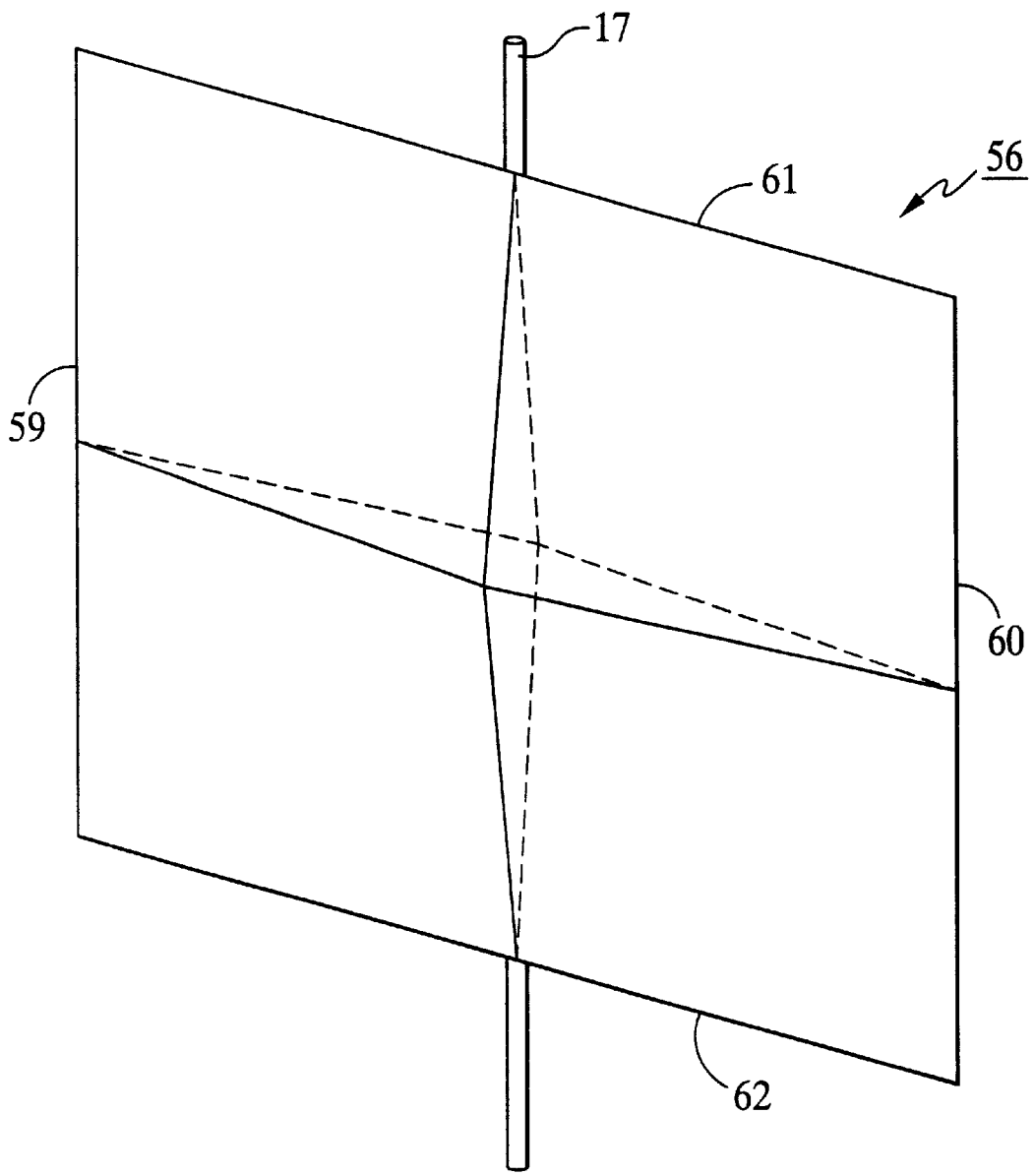
FIG. 7 shows a display target having both of its side edges tapered and its top and bottom edges tapered.
Figure 8:
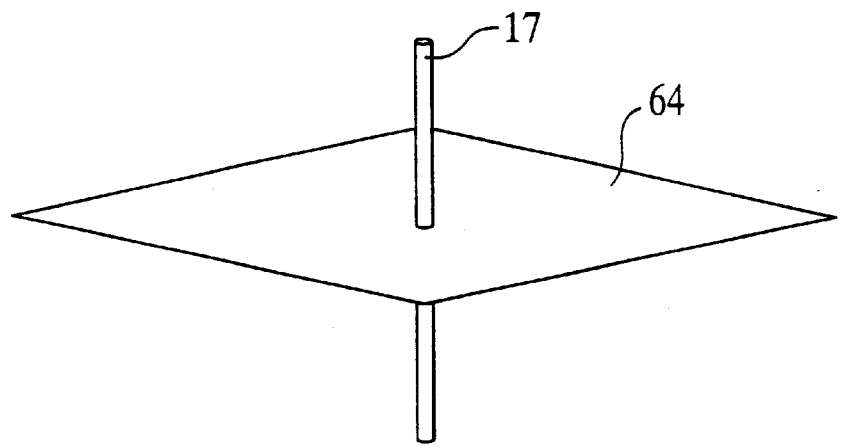
FIG. 8 shows a cross-section of the display target of FIG. 7 taken roughly perpendicular to its axis of rotation.
Figure 9:
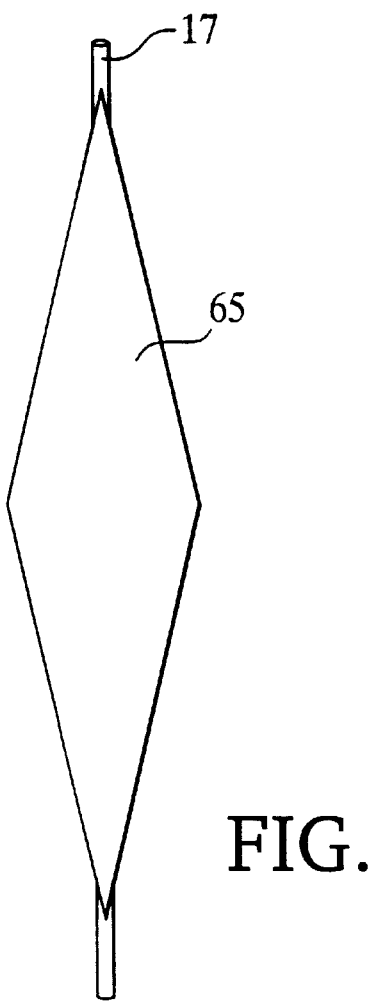
FIG. 9 shows a cross-section of the display target of FIG. 7 taken roughly parallel to its axis of rotation.

Returning to FIG. 3, top and bottom edges 46 and 47 of display target 16 may also be tapered in addition to, or instead of, the side edges. For example, FIG. 7 shows a display target 56 in which both side edges 59 and 60 and top and bottom edges 61 and 62, respectively, are tapered. This configuration reduces edge-on darkness from the sides of the display target and from above (or below) the display target. In this case, both cross sections of the display target (i.e., that taken parallel to, and that taken perpendicular to, its axis of rotation 17) are diamond (or generally non-rectangular, e.g., convex) in shape. FIG. 8 shows a cross-section 64 of display target 56 taken roughly perpendicular to axis 17, and FIG. 9 shows a cross-section 65 of display target 56 taken roughly parallel to axis 17.

Ultra-thin Display target

Another way to reduce the amount of edge in a viewer's line of sight is to reduce the overall thickness of the display target. More specifically, conventional display targets have to have enough rigidity to withstand rotation sufficient to form 3-D images. Accordingly, they require a thickness of 1.5 mm or more, depending upon the type of material from which they are made. Thicknesses of this magnitude, however, result in increased amounts of edge-on darkness in resulting images.

Figure 10:
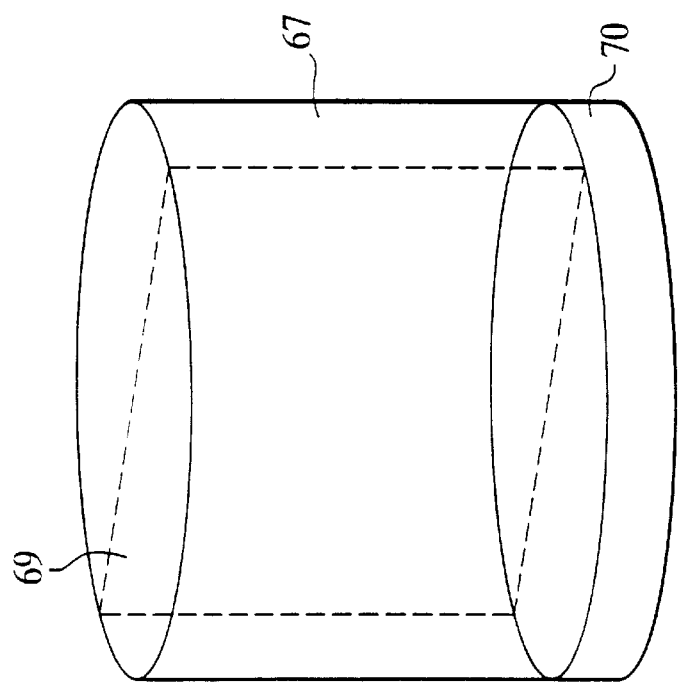
FIG. 10 shows a display target embedded in a translucent host.

According to another embodiment of the invention, which is described in greater detail below, it is possible to reduce the thickness of all or part of the display target to the order of one millimeter (1 mm) or less (e.g., down to the micron level) while still maintaining the integrity of the target during rotation. This is achieved by embedding the display target in a host 67, such as the cylinder shown in FIG. 10. Host 67 is made of a translucent or transparent material such as plexiglass which holds display target 69 in place during rotation, and which rotates with the display target. The host need not be cylindrical as shown. Rather, its shape can vary depending upon the geometry of the system.

During operation of the system, controller 15 may need to modify scanning control signal 26 and/or illumination control signal 21 to account for the index of refraction of the host. Alternatively, additional optics (e.g., holographic optical elements, scanning mirrors, position encoders, or light sources) may be included in the system to make any necessary corrections to the direction of light beams 19. These and other optics may be fixed to the bottom of the host, e.g., at location 70 shown in FIG. 10.

In this embodiment, display target 69 may comprise a plexiglass or acrylic background coated with vellum, such as that described above except thinner (e.g., on the order of 1 mm or less). The edges of such a display target can also be tapered as described above so as to reduce the amount of edge-on darkness even further. In this regard, even display targets that are not ultra-thin (e.g, those thicker than 1.5 mm) can be embedded in a translucent host so as to increase their rotational stability.

Since the translucent host maintains the rigidity of a display target embedded therein, there may not be a need to include a plexiglass or acrylic background on the display target. Eliminating this background decreases the thickness of the display target even further. For example, a vellum coating alone may be embedded in the host. In some embodiments of the invention, this vellum coating is on the order of about 3 mils thick (i.e., 3/1000 of an inch or about 80 microns). Using a display target this thin can reduce edge-on darkness considerably.

Figure 11:
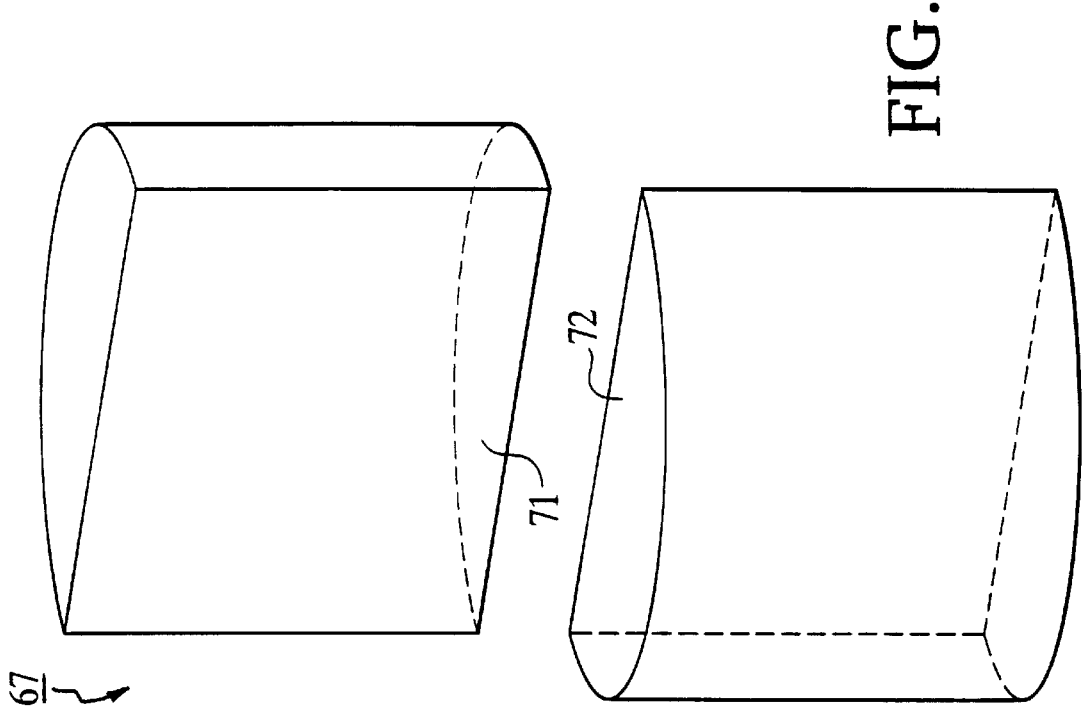
FIG. 11 shows two halves of a host.
Figure 12:
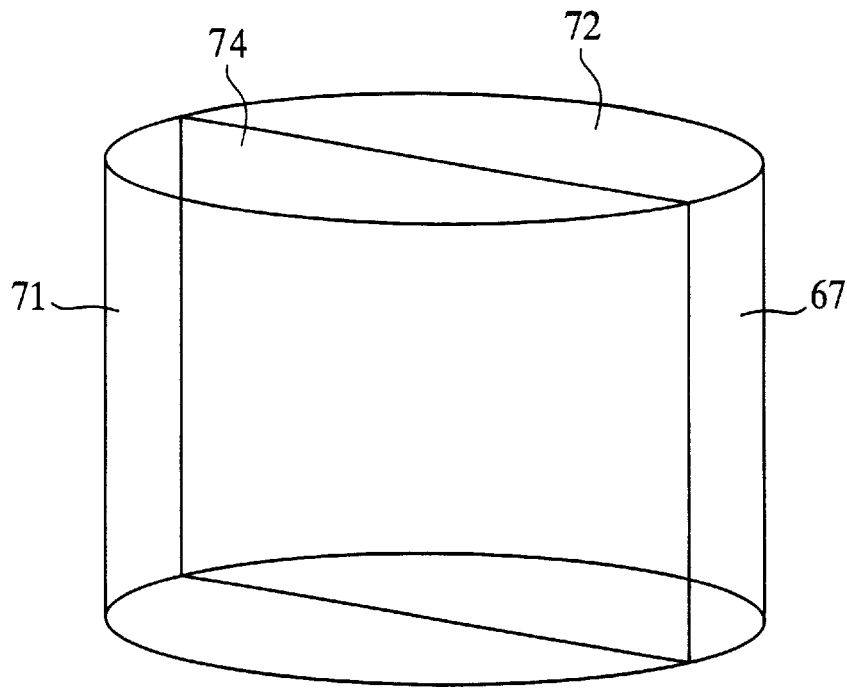
FIG. 12 shows the two halves depicted in FIG. 11 bound together to form an embedded display target.

The display target may also comprise a thin (e.g., on the order of several microns) layer of diffusive/reflective paint embedded in the host. That is, as shown in FIG. 11, host 67 can be cut in two in the shape of the display target, and paint applied to one or both of the surfaces of halves 71 and 72. The two halves may then be bound together, as shown in FIG. 12 such that the paint 74 (i.e., the display target) is embedded in the host. Here, the only limitation on the thinness of the display target is the paint itself. That is, the display target may be as thin as the minimum thickness of the layer of paint required to create a diffusive/reflective surface inside the host. In this regard, the invention is not limited to the use of paint. Rather, any other type of reflective/diffusive substance may be embedded inside the translucent host in the manner described above to form the display target.

Figure 13:
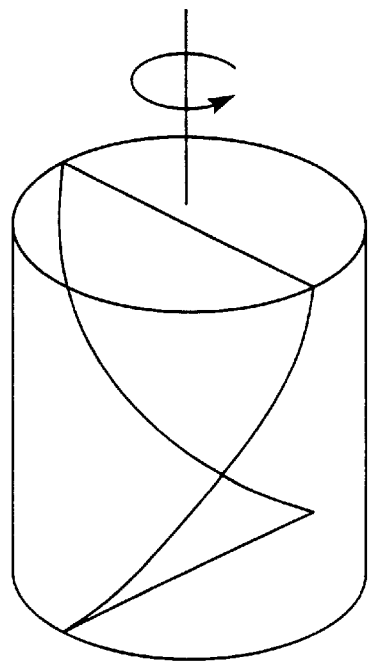
FIG. 13 shows a helical display target embedded inside of a translucent host.

The display target configurations depicted herein have all included rectangular display targets. However, the invention is not limited to use with rectangular targets. In fact, all aspects of the invention can be used with display targets having a variety of shapes. For example, an ultra-thin helical display target can be embedded in a translucent host, as shown in FIG. 13. Similarly, oval, circular and other shaped display targets can be embedded in the translucent host. Likewise, oval, circular, helical, etc. display targets with tapered edges can be used either in connection with a host or not.

Figure 17:
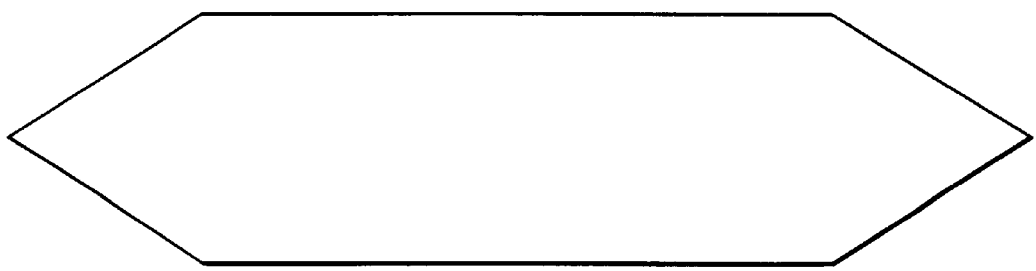
FIG. 17 shows a cross-section of an alternative embodiment of a display target with tapered edges.

Moreover, the display targets with tapered edges described herein all show tapering beginning from roughly a center point (e.g., an axis of rotation) of the target. However, this is also not a requirement of the invention. Rather, tapering may begin at any point of the display target as shown, for example, in FIG. 17.

Figure 2:
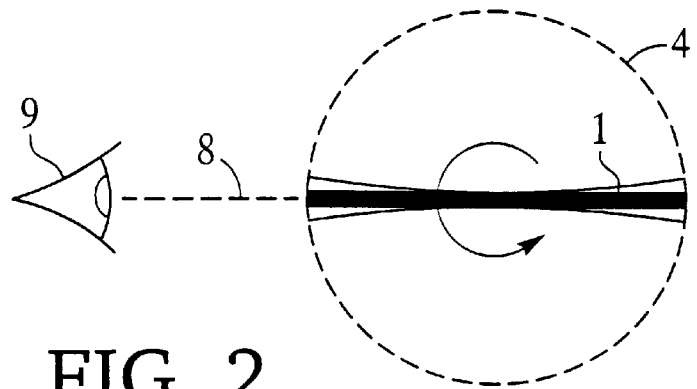
FIG. 2 illustrates a cause of edge-on darkness in conventional display targets.
Figure 14:
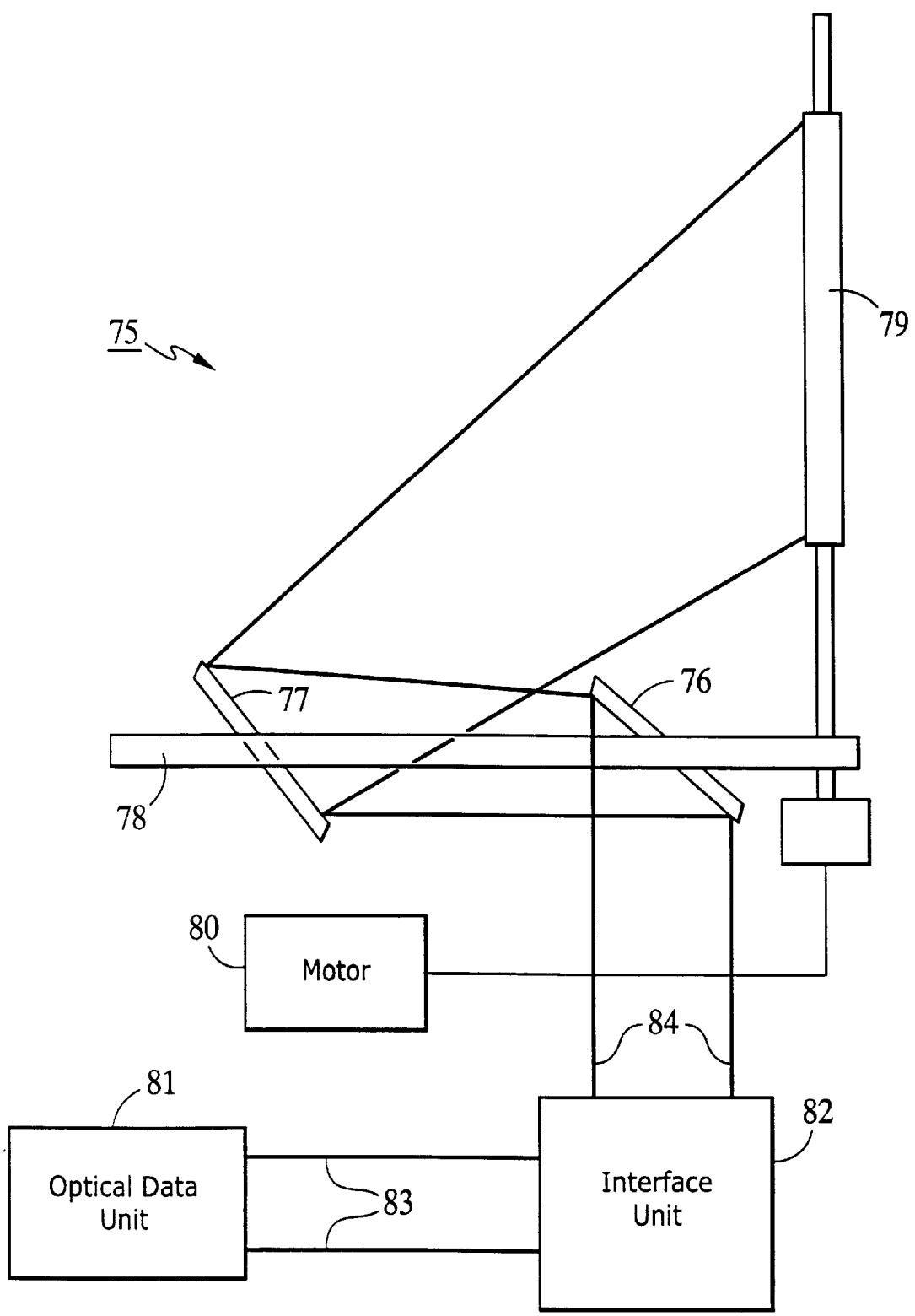
FIG. 14 shows an alternate 3-D display system in which the invention may be implemented.

Finally, the display target configurations described above are not limited to use with the 3-D display system described above. Rather, they can be used in any multiplanar 3-D display systems. For example, FIG. 14 shows an example of an alternative 3-D display system 75 in which the display target configurations may be used. As shown, system 75 includes components similar to that of FIG. 2.

More specifically, in system 75, the scanning optics include first and second reflectors 76 and 77 and a connecting structure 78. These elements rotate along with display target 79 (a side view of which is depicted), which rotation is controlled by motor 80 (which, in turn, is controlled by a controller (not shown)). Frames of images 83 (i.e., light) are output by optical data unit 81 to interface unit 82. Interface unit 82 generates a series of interfaced images 84 and outputs the images to the scanning optics which directs them onto display target 79.

U.S. Pat. No. 5,754,147, entitled "Method And Apparatus For Displaying Three-Dimensional Volumetric Images", describes the details of a 3-D display system similar to that shown in FIG. 14. The contents of U.S. Pat. No. 5,754,147 are therefore incorporated herein by reference.

The present invention has been described with respect to particular illustrative embodiments. It is to be understood that the invention is not limited to the above-described embodiments and modifications thereto, and that various changes and/or modifications are within the scope of the appended claims.

What is claimed is:

1. A display target which receives a projected image and which rotates about an axis to form a three-dimensional image from the projected image, the display target comprising front and back surfaces that meet at locations relative to the axis to form tapered edges.

2. A display target according to claim 1, wherein the front and back surfaces meet at distances from the axis to form tapered side edges of the display target.

3. A display target according to claim 1, wherein the front and back surfaces meet along the axis to form tapered top and bottom edges of the display target.

4. A display target according to claim 1, wherein the front and back surfaces meet at distances from the axis to form tapered side edges of the display target; and wherein the front and back surfaces meet along the axis to form tapered top and bottom edges of the display target.

5. A display target according to claim 1, wherein a thickness of the display target at each tapered edge is less than a thickness of the display target between opposing tapered edges, with thickness being defined by a distance between the front and back surfaces.

6. A display target according to claim 1, wherein, a cross-sectional area of the display target taken parallel to the axis is substantially diamond-shaped.

7. A display target according to claim 1, wherein, a cross-sectional area of the display target taken perpendicular to the axis is substantially diamond-shaped.

8. A display target according to claim 1, wherein, a cross-sectional area of the display target taken parallel to the axis is one of convex and concave in shape.

9. A display target according to claim 1, wherein, a cross-sectional area of the display target taken perpendicular to the axis is one of convex and concave in shape.

10. A display target according to claim 1, wherein the front and back surfaces are substantially rectangular.

11. A display target according to claim 1, wherein the front and back surfaces are substantially helical.

12. A display target according to claim 1 comprised of a molded plexiglass screen.

13. A display target according to claim 1 which is embedded in a translucent host.

14. A display apparatus for use in a three-dimensional display system, the display apparatus comprising:

a translucent host; and a display target, inside the translucent host, which receives a projected image and which rotates while inside the translucent host to form a three-dimensional image from the projected image, at least a portion of the display target having a thickness on the order of one millimeter (1 mm) or less.

15. A display apparatus according to claim 14, wherein the translucent host comprises a translucent cylinder, and the display target is embedded in the translucent cylinder.

16. A display apparatus according to claim 14, wherein the display target is substantially rectangular.

17. A display apparatus according to claim 14, wherein the display target is substantially helical.

18. A display apparatus according to claim 14, wherein the display target rotates about an axis to form the three-dimensional image; and wherein the display target is comprised of front and back surfaces that meet at locations relative to the axis to form tapered edges.

19. A display apparatus according to claim 18, wherein a cross-sectional area of the display target taken parallel to the axis is substantially diamond-shaped.

20. A display apparatus according to claim 18, wherein, a cross-sectional area of the display target taken perpendicular to the axis is substantially diamond-shaped.

21. A display apparatus according to claim 14, wherein the display target is a layer of paint embedded inside the translucent host.

22. A three-dimensional display system comprising:

a display target which receives a projected image and which rotates about an axis to form a three-dimensional image from the projected image, the display target having front and back surfaces that meet at locations relative to the axis to form tapered edges;

scanning optics which directs light to the display target to form the projected image; and a controller which controls operation of the display target and the scanning optics.

23. A system according to claim 22, further comprising a translucent host, wherein the display target is embedded in the translucent host.

24. A three-dimensional display system comprising:

a translucent host;

a display target, embedded in the translucent host, which receives a projected image and which rotates about an axis to form a three-dimensional image from the projected image, at least a portion of the display target having a thickness on the order of one millimeter (1 mm) or less;

scanning optics which directs light to the display target to form the projected image; and a controller which controls operation of the display target and the scanning optics.

25. A system according to claim 24, wherein the display target is substantially rectangular.

26. A system according to claim 24, wherein the display target is substantially helical.

27. A system according to claim 24, wherein at least a portion of the scanning optics are fixed to the translucent host.

28. A system according to claim 27, wherein the portion of the scanning optics are fixed to a bottom of the translucent host.

* * * * *

UNITED STATES PATENT AND TRADEMARK OFFICE
CERTIFICATE OF CORRECTION

PATENT NO. : 6,183,088 B1 Page 1 of 1
DATED : February 6, 2001
INVENTOR(S) : Andrew G. Lore, Michael G. Giovinco and Gregg E. Favalora It is certified that error appears in the above-identified patent and that said Letters Patent is hereby corrected as shown below:

<u>Title page,</u>
References Cited, U.S. 5,537,251, "7/1996" should be -- 3/1982 --.

Signed and Sealed this

Twenty-eighth Day of May, 2002

Attest:

*Attesting Officer*

JAMES E. ROGAN
*Director of the United States Patent and Trademark Office*